No. 645,202. Patented Mar. 13, 1900.
R. A. CARTER.
CHAIN.
(Application filed Feb. 3, 1899.)

(No Model.) 2 Sheets—Sheet 1.

WITNESSES: Chas. F. Miller, F. E. Gaither

INVENTOR, Robert A. Carter, by Darwin S. Wolcott Att'y.

No. 645,202. Patented Mar. 13, 1900.
R. A. CARTER.
CHAIN.
(Application filed Feb. 3, 1899.)
(No Model.) 2 Sheets—Sheet 2.

WITNESSES:
Chas. F. Miller.
F. E. Gaither.

INVENTOR,
Robert A. Carter
by Darwin S. Wolcott
Att'y.

UNITED STATES PATENT OFFICE.

ROBERT A. CARTER, OF PITTSBURG, PENNSYLVANIA.

CHAIN.

SPECIFICATION forming part of Letters Patent No. 645,202, dated March 13, 1900.

Application filed February 3, 1899. Serial No. 704,374. (No model.)

*To all whom it may concern:*

Be it known that I, ROBERT A. CARTER, a citizen of the United States, residing at Pittsburg, in the county of Allegheny and State of Pennsylvania, have invented or discovered certain new and useful Improvements in Chains, of which improvements the following is a specification.

The invention described herein relates to certain improvements in chains, &c., and has for its object the formation of an antifriction-bearing between connected links, thereby avoiding all liability of any kinking or locking of the links out of line with each other and also affording increased bearing-surfaces between links.

The invention is hereinafter more fully described and claimed.

Figure 1:
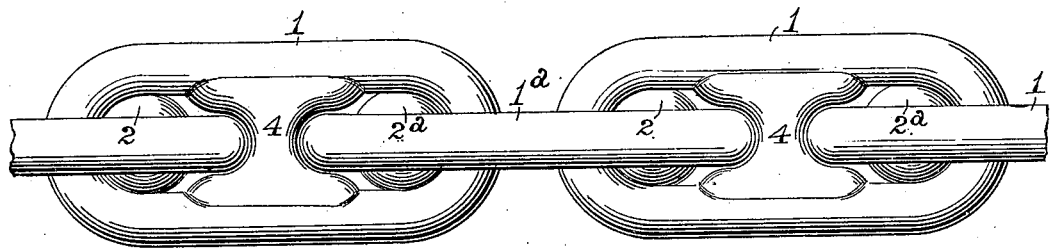
Figure 2:
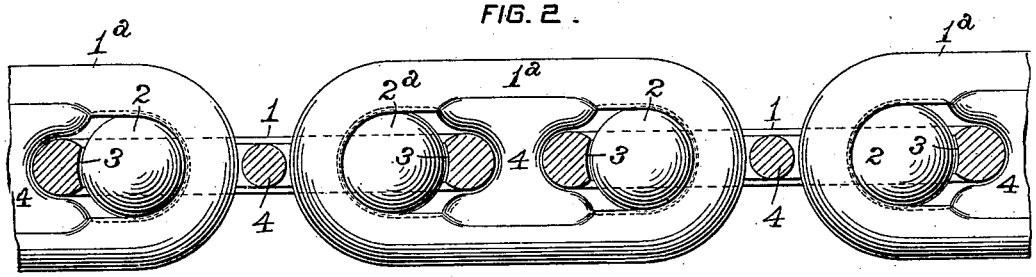
Figure 3:
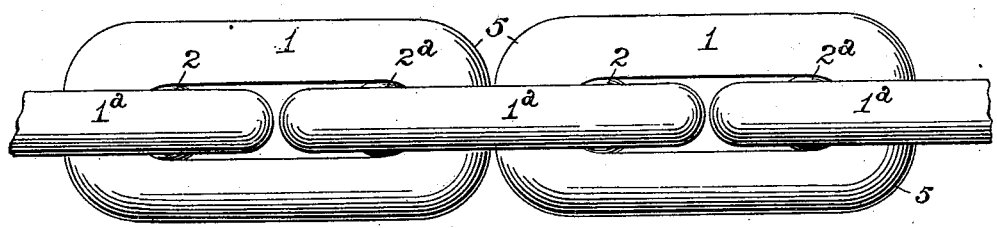
Figure 4:
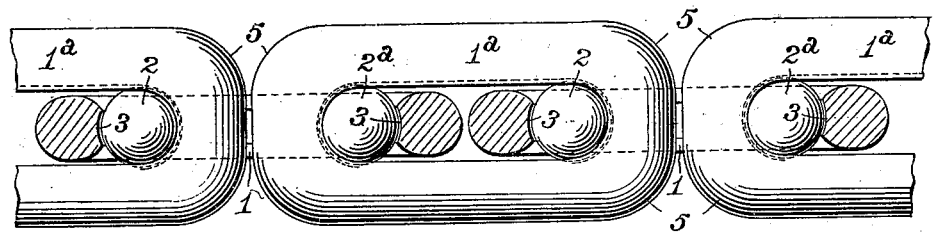

In the accompanying drawings, forming a part of this specification, Figure 1 is an elevation of my improved chain. Fig. 2 shows the links in elevation and section alternately. Figs. 3 and 4 are views similar to Figs. 1 and 2, illustrating a modification in the structure of the chain. Figs. 5 and 6 and 7 and 8 are views similar to Figs. 1 and 2, respectively, illustrating further modifications of my improvements.

In the construction shown in Figs. 1 and 2 the inner walls of the links 1 1ª, &c., at and adjacent to the ends are grooved, thereby forming seats 3 for the reception of the balls 2 2ª, &c. These balls, which are formed of hard steel or other suitable material, are interposed, as shown, between the ends of interlocking links, so that each link bears against a ball and the engaging ends of adjacent links on opposite sides of the same ball. The grooves or seats in the inner walls of the links can be formed in any suitable manner, but are preferably formed during the rolling of the bar from which the links are formed. In making the chain the bar-sections are bent to the desired shape and the ends welded in the usual or any suitable manner, the interlocking links being inserted prior to the welding of the ends of the link. If desired, the balls may be placed in position prior to the complete closure and welding of the link, or the link may be spread laterally after being welded, so as to permit of the insertion of the balls, and the sides then forced in, so that the balls will be loosely caught in the grooves or seats, which not only serve to retain the balls in position, but also afford broader bearing-surfaces for the links.

In case the links are braced transversely by struts 4 the edges of the latter when the links are short are recessed for the reception of the interlocking link 1ª; but sufficient space should be left to permit of the free lateral movement of the link. In addition to bracing the link transversely the struts 4 serve to hold the balls in the seats 3 at the ends of the links.

In some cases it may be desirable to employ balls of a diameter less than the distance between the inner walls of the sides of the links, as shown in Figs. 3 and 4. In such case provision is made for preventing the lateral movement of one of the links to such an angular position with relation to the interlocking link as will permit of the ball being shifted or permitted to drop out of position. This limitation of the lateral movement of the links can be effected by the formation of shoulders 5 on the outer walls of the adjacent ends of links. These shoulders are made to project such a distance that when one of the links is moved laterally one of its shoulders will bear upon the corresponding shoulder of the adjacent link and prevent any such further lateral movement as would release the ball. These shoulders are preferably formed by thickening the walls at the ends of the links, as clearly shown in Fig. 4, thereby increasing the strength of the links at the ends.

Figure 5:
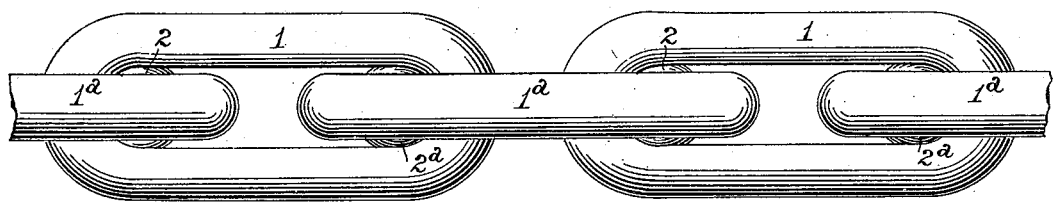
Figure 6:
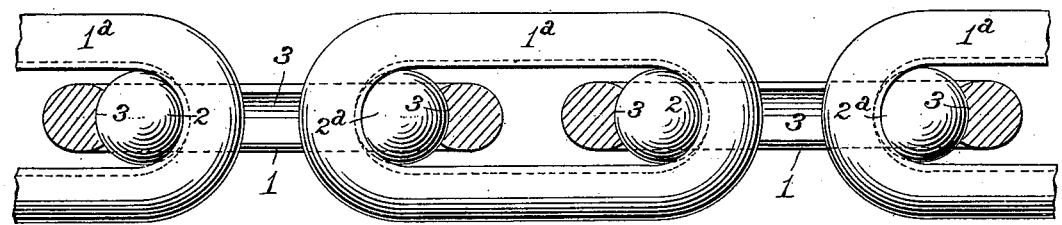

In the construction shown in Figs. 5 and 6 alternate links 1 have grooves extending entirely around the internal perimeter of the links, and the sides of such links are pressed in, so that the balls will be held within the links at all points. The other links are made somewhat larger as regards their internal width than the diameters of the balls. This construction imparts a greater flexibility to the chain. It is characteristic of this construction that the balls forming the bearings of three interlocking links are held by the groove of the middle or holding link of each series of three.

Figure 7:
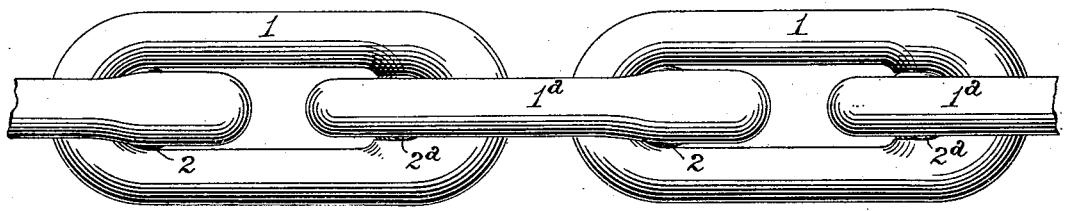
Figure 8:
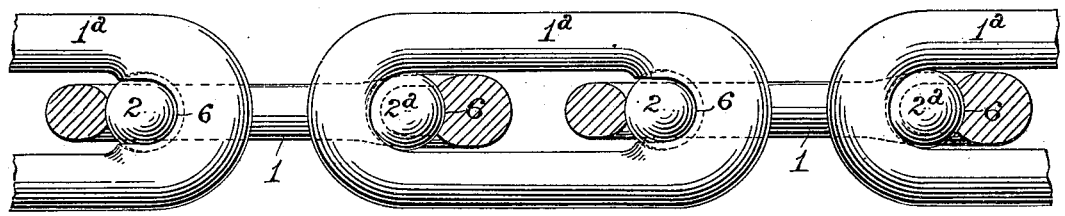

In the construction shown in Figs. 7 and 8 each link is provided at one end with a seat 6, in which the ball is retained by the abutments or shoulders at the ends of the groove or seat. The opposite end of the link is of the usual construction, except that its inner wall is slightly concave to afford a broader bearing on the ball held in the interlocking link. As shown in Figs. 7 and 8, the seat 6 is made to extend a sufficient distance along the inner wall of the link to surround a little more than half the circumference of the ball.

It is characteristic of my improvement that the balls which are inserted between the bearing-surfaces of engaging or interlocking links permit of an increase in area of such bearing-surfaces without limitation of the freedom of movement of the links. It is also characteristic of my invention that provision is made for retaining the balls in operative position regardless of the relative positions of adjacent links.

I claim herein as my invention—

1. In a chain the combination of closed engaging or interlocking links of uniform size and shape provided with internal concave grooves or seats for holding the balls within the links and balls interposed between the ends of such links, substantially as set forth.

2. The combination of a chain consisting of closed links of uniform size and shape, balls interposed between the ends of the engaging or interlocking links and means for retaining the balls in operative positions, substantially as set forth.

3. The combination in a chain of a series of engaging links, each provided with a concave seat at one end and shoulders or abutments at the ends of the seat, and balls located in said seats and forming antifriction-bearings between the links, substantially as set forth.

In testimony whereof I have hereunto set my hand.

ROBERT A. CARTER.

Witnesses:
DARWIN S. WOLCOTT,
F. E. GAITHER.